(12) United States Patent
Thomas et al.

(10) Patent No.: US 9,993,114 B2
(45) Date of Patent: Jun. 12, 2018

(54) LID WITH CHECK VALVE

(71) Applicant: Breville Pty Limited, Alexandria, NSW (AU)

(72) Inventors: Mark Thomas, Leichhardt (AU); Ze Kang Lai, Glenfield (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 39 days.

(21) Appl. No.: 15/028,714

(22) PCT Filed: Oct. 20, 2014

(86) PCT No.: PCT/AU2014/000996
§ 371 (c)(1),
(2) Date: Apr. 17, 2016

(87) PCT Pub. No.: WO2015/054740
PCT Pub. Date: Apr. 23, 2015

(65) Prior Publication Data
US 2016/0287018 A1 Oct. 6, 2016

(30) Foreign Application Priority Data

Oct. 18, 2013 (AU) .............................. 2013904014
Oct. 22, 2013 (AU) .............................. 2013904073

(51) Int. Cl.
*A47J 43/046* (2006.01)
*A47J 43/07* (2006.01)
*B01F 15/00* (2006.01)

(52) U.S. Cl.
CPC ......... *A47J 43/0716* (2013.01); *A47J 43/046* (2013.01); *B01F 15/00779* (2013.01); *B01F 15/00993* (2013.01); *B01F 2215/0026* (2013.01)

(58) Field of Classification Search
CPC ........................................................ A47J 43/046
USPC ..................... 220/203.29; 366/205, 314, 347
See application file for complete search history.

(56) References Cited

U.S. PATENT DOCUMENTS

| 148,130 | A | * | 3/1874 | Moore | ................. | B65D 35/42 |
| | | | | | | 220/203.29 |
| 3,417,972 | A | * | 12/1968 | Vincent | ................. | A47J 43/046 |
| | | | | | | 241/199.12 |
| 7,993,694 | B2 | * | 8/2011 | Goderiaux | ............ | A47J 36/165 |
| | | | | | | 366/304 |
| 2006/0198241 | A1 | | 9/2006 | Krishnachaitanya et al. | | |
| 2009/0207688 | A1 | | 8/2009 | Flackett | | |

(Continued)

FOREIGN PATENT DOCUMENTS

EP          2 522261 A1    11/2012
WO       WO-82/03543 A1   10/1982

(Continued)

OTHER PUBLICATIONS

Extended European Search Report for EP 14853697.2, dated Jun. 29, 2017.

(Continued)

*Primary Examiner* — David Sorkin
(74) *Attorney, Agent, or Firm* — Marshall, Gerstein & Borun LLP (57) ABSTRACT

A lid for a food processing device with a rotating blade within a vessel has an one-way valve for allowing air to escape the vessel.

18 Claims, 10 Drawing Sheets

(56) References Cited

U.S. PATENT DOCUMENTS

2014/0134304 A1* 5/2014 Picozza ................ A47J 43/042
426/231

FOREIGN PATENT DOCUMENTS

WO    WO-2011/153587 A1    12/2011
WO    WO-2012/075522 A1    6/2012

OTHER PUBLICATIONS

International Search Report and Written Opinion for PCT/AU2014/000996, dated Nov. 18, 2014.
International Preliminary Report on Patentability for PCT/AU2014/000996, dated Apr. 19, 2016.

* cited by examiner

LID WITH CHECK VALVE

FIELD OF THE INVENTION

The invention pertains to lids and more particularly to a lid for a food and beverage processor or blender having a check valve for expelling air from within a vessel that is otherwise sealed by the lid.

BACKGROUND OF THE INVENTION

A blender is used to mix, stir, liquefy and otherwise process foods and beverages. A typical blender has a motorised base with a removable jug, the jug being isolated from the outside environment by a lid. Vigorous blending within the jug can cause the lid to dislodge as a result of pressure changes within the jug. To resolve this problem in the past, blenders have employed interference fit seals and locking structures such as bayonet features to resist those forces which tend to dislodge the lid.

Other food processing devices have similar problems when pressure or forces from rotating blades or tools, heat, hot air or steam within a processing vessel act to dislodge the vessel's lid. The problem is exacerbated when the level of food within the vessel is high.

The present invention seeks to overcome the problem of inadvertent dislodgement of the lid by managing the airflow the food and liquid processing environment and by providing an outlet valve, check-valve or passageway that ensures that the lid will not become dislodged as a result of the movement air or foods within the jug or vessel. The invention has application to any food processing vessel having a lid and a rotating blade.

SUMMARY OF THE INVENTION

Described herein is a lid having a check-valve or one-way valve that allows air to escape from the jug.

Also described is a vessel or jug lid having check-valve for allowing air to escape from an interior of the jug and a relief valve for selectively allowing air to enter the interior of the jug.

Additionally described is a vessel or jug lid having a removable measuring cup and a one-way valve for allowing air to escape from an interior of the jug.

BRIEF DESCRIPTION OF THE DRAWING FIGURES

In order that the invention be better understood, reference is now made to the following drawing figures in which:
to the following drawing figures in which.

BEST MODE AND OTHER EMBODIMENTS

Figure 1:
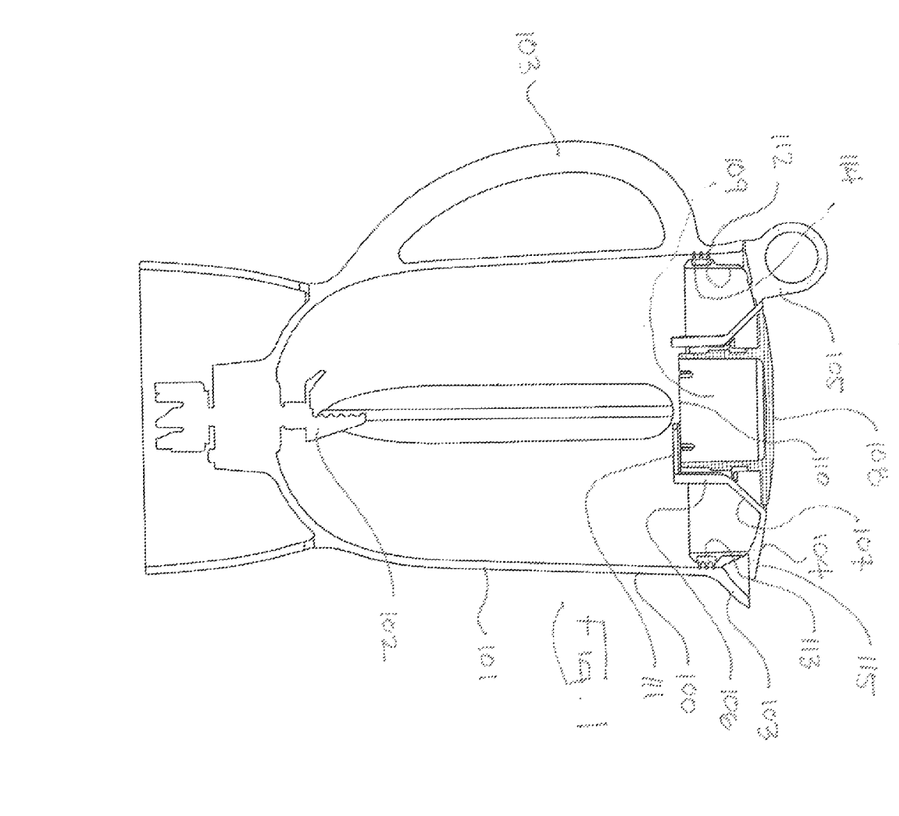
FIG. 1 is a cross sectional view of a blender having a lid and measuring cup.
Figure 2:
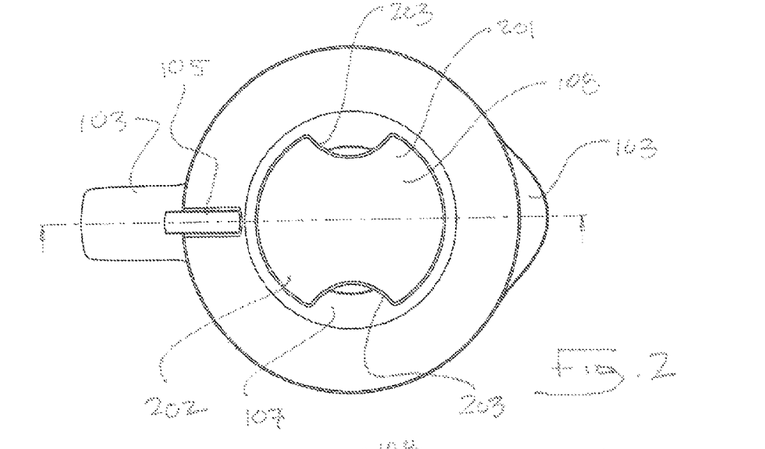
FIG. 2 is a top plan view of the blender depicted in FIG. 1.

As shown in FIGS. 1 and 2, a jug for a blender 100 comprises an elongated vessel or jug lot having an internal rotating blade assembly 102 and a handle 103. The vessel has a pouring spout 103 and is sealed by a lid 104. The body of the lid 104 has a vertically oriented pull-ring 105 extending from the periphery of the upper surface. The lid 104 also has a cylindrical 106 opening with a conical of funnel-like entry or tapered pilot 107. The central opening 106 is adapted to receive a flush mounted closure or cap 108 having an internal void 109 with an open end 110 that acts as and will be described as a measuring cup. The travel of the measuring cup 108 toward the blades 102 may be limited by an inward extending lower rim 111 of the cylindrical central opening 106.

The lid further includes a cylindrical, open ended body portion 112 that extends into the interior of the jug 100. An exterior surface of the body portion 112 has a circumferential groove 113 for receiving a circumferential or peripheral polymeric seal 114 that contacts and seals against an inner surface of the jug 100. The lid also has a peripheral overhanging rim 115 that abuts the upper rim of the jug 100 and thus limits the downward travel of the lid. Although a lid for a blender is used by way of example, it will be appreciated that the teachings of the present invention may be applied to lids for a variety of food handling and food processing devices having a vessel in which the vessel's lid may be dislodged by pressure developed in the vessel.

As shown in the example of FIG. 2, the upper surface 201 of the measure cup 108 includes a wide radial flange 202 having an opposing cut-outs or relief areas 203 that act as finger grips for installing and removing the measuring cup 108.

Figure 3:
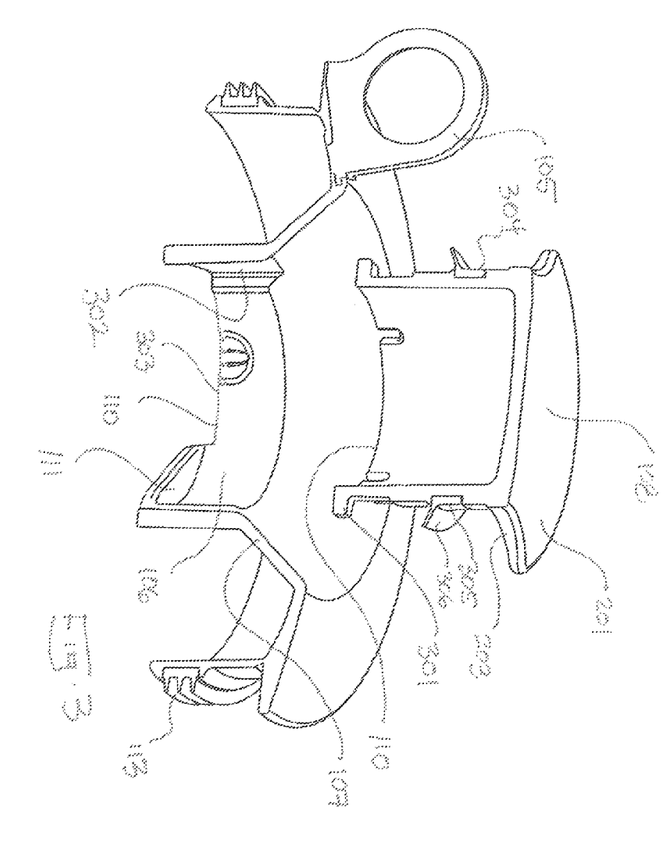
FIG. 3 is a cross section of the lid, measuring cup and seal depicted in FIG. 1.

As shown in FIG. 3, the measuring cup 108 has one or more male bayonet features 301 located about its lower rim or mouth opening 110. The male bayonet features 301 cooperate with a similar number of vertical channels 302 that extend along the vertical height of the interior of the central opening 106. Portions 303 of the lower rim 110 are ramped to cooperate with the male bayonet features 301. Thus, and as shown in FIG. 4, once the male bayonet features 301 extend through the channels 302, rotation of the measure cup 108 using, for example, the finger grip 203 acts to draw the measuring cup 108 down into the opening 106 until the lower rim 110 of the measuring cup 108 bottoms out against the internal rim or shelf 111.

Figure 4:
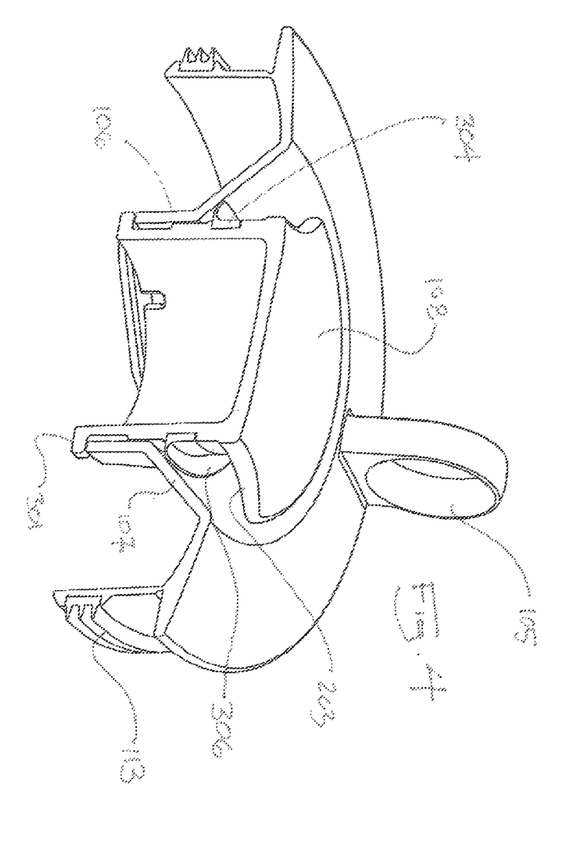
FIG. 4 is a cross section of the lid, measuring cup and seal depicted in FIG. 1.

As suggested by FIGS. 3 and 4, continued downward motion of the measuring cup 108 causes a flexing of its outer circumferential or lip seal 304. As shown in FIG. 3, the seal 304, in its resting position, has in this example, a cylindrical body 305 from which extends a circumferential lip 306. In the rest position and as shown in FIG. 3, the lip 306 extends outward and downward (or toward the lower rim 110). When the measuring cup is in its lower most position, and as shown in FIG. 4, the lip 306 flexes upwardly against the upper surface of the pilot 107.

Figure 5A:
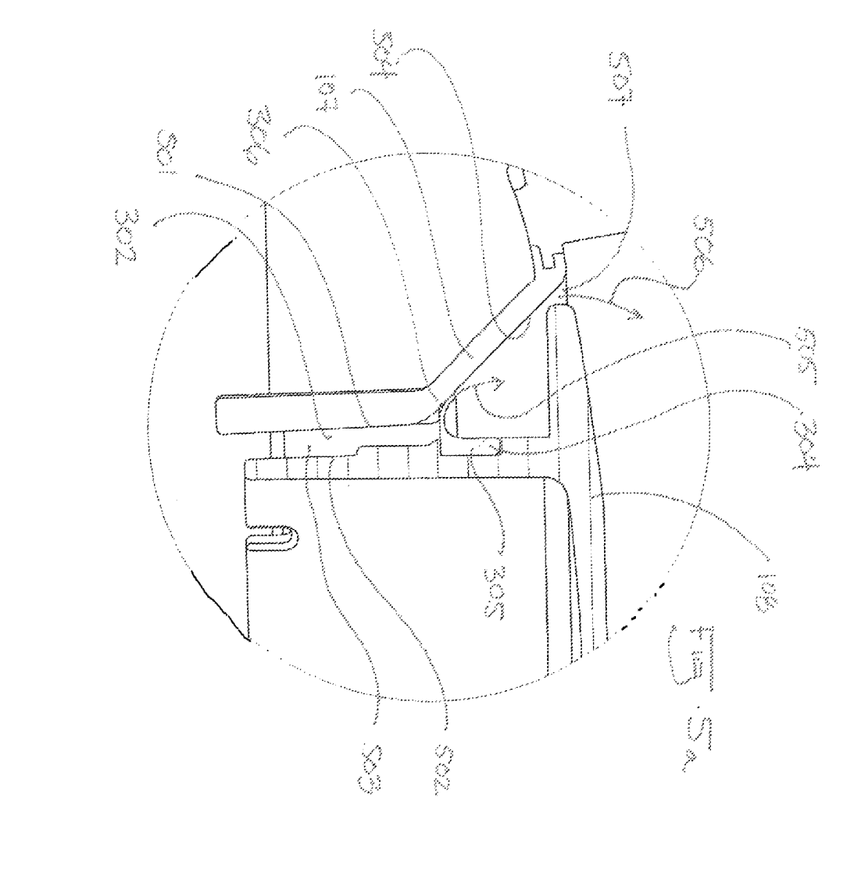
FIG. 5a is a cross section of the lid, measuring cup and seal depicted in FIG. 1.

As shown in FIG. 5(a), a gap exists between the surface of 501 of the vertical channel or channels 302 and the outside surface 502 of the measuring cup 108. This gap 503 provides an access passageway for air inside the jug to flow toward the seal 304. Because of the upward flexing of the sears lip 306 and the force that the lip exerts against the upper surface 504 of the pilot 107, air can escape the interior of the jug 505 and in doing so, further flexes the lid 306. Air passing past the seal 304 is expelled 506, for example, through the gap 507 that exists between the measuring cup's flange 201 and the pilot 107. However, the conformation of the seal's lip 306 prevents air from entering the interior of the jug when the measuring cup 108 is fully installed. It acts as a check-valve. The resilient force exerted by the lip 306 against the taper pilot 107 assists in the removal of the measuring cup 108 when it is rotated counter clockwise so as to return the male bayonet features 301 toward the vertical channels 302.

Figure 5B:
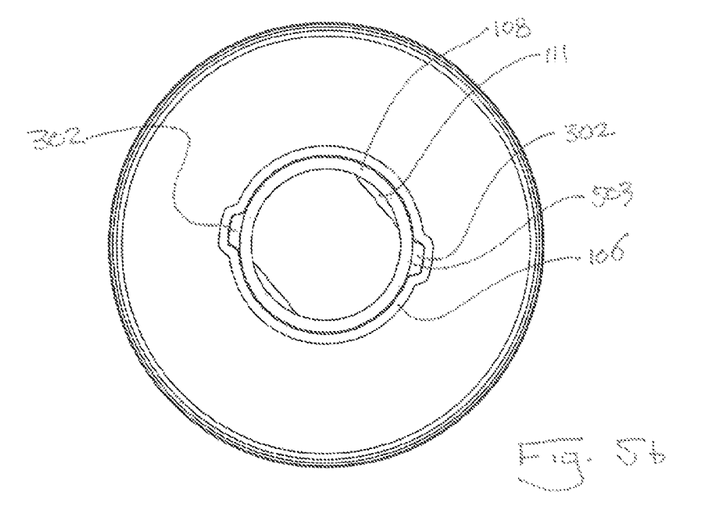
FIG. 5b is a cross section through the lid and measuring cup depicted in FIG. 1.

As shown in FIG. 5(b), the cylindrical sidewalls of the measuring cup 108 make fairly close contact with the interior cylindrical walls of the central opening 106. However, a convenient vent is formed exists by way of the increased cross-sectional area of the gap 603 located in the area of the vertical channels 302. The gap 503, as previously mentioned, provides a useful passageway for air, toward the seal 304.

Figure 6:
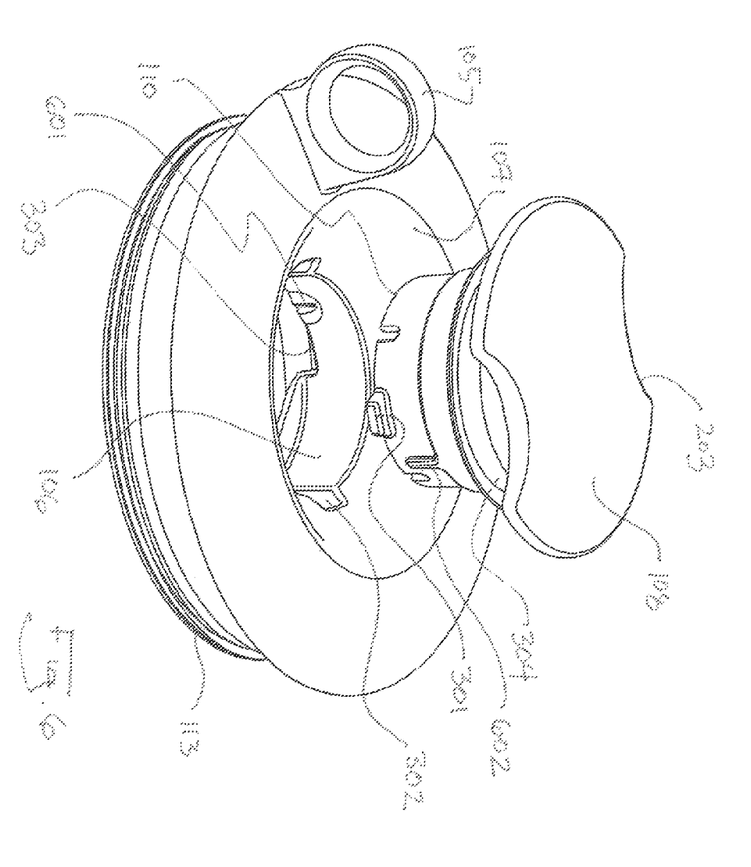
FIG. 6 is perspective view of the lid and the measuring cup depicted in FIG. 1.

As shown in FIG. 6, the interior surface of the cylindrical, central opening 106 may have one or more female detent features that cooperate with male feature or protrusions 602 located on an outside surface of the sidewall of the measuring cup 108. When the feature, 601, 602 engage, they stabilise the measuring cup 108 and act to further thwart unwanted vibration of the measuring cup 108 when the blender's motor is operational.

Figures 7, 8:
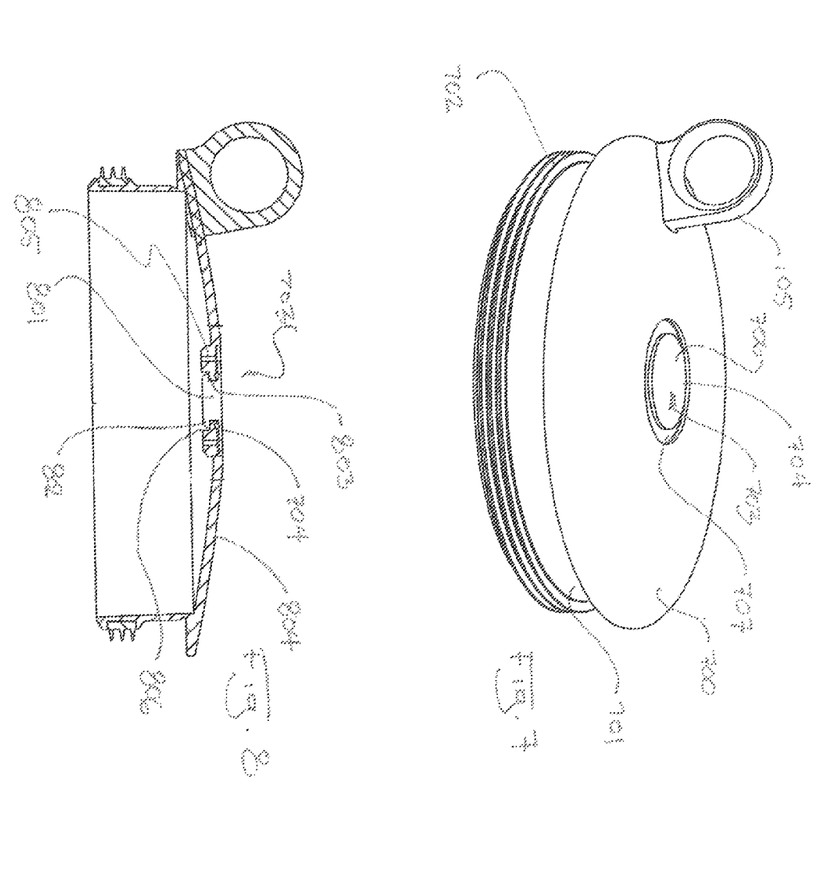
FIG. 7 is perspective view of a lid incorporating a check valve.
FIG. 8 is a cross section through the lid depicted in FIG. 7.
Figure 9:
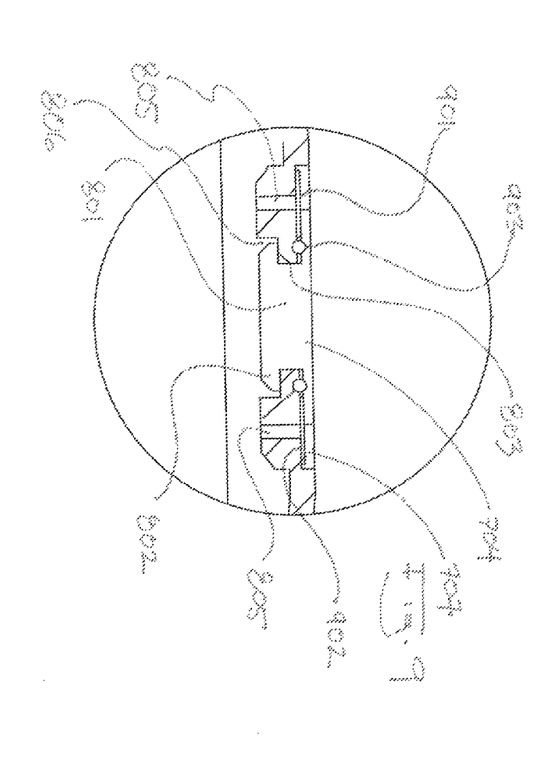
FIG. 9 is a detail of the check valve depicted in FIG. 8.
Figure 10:
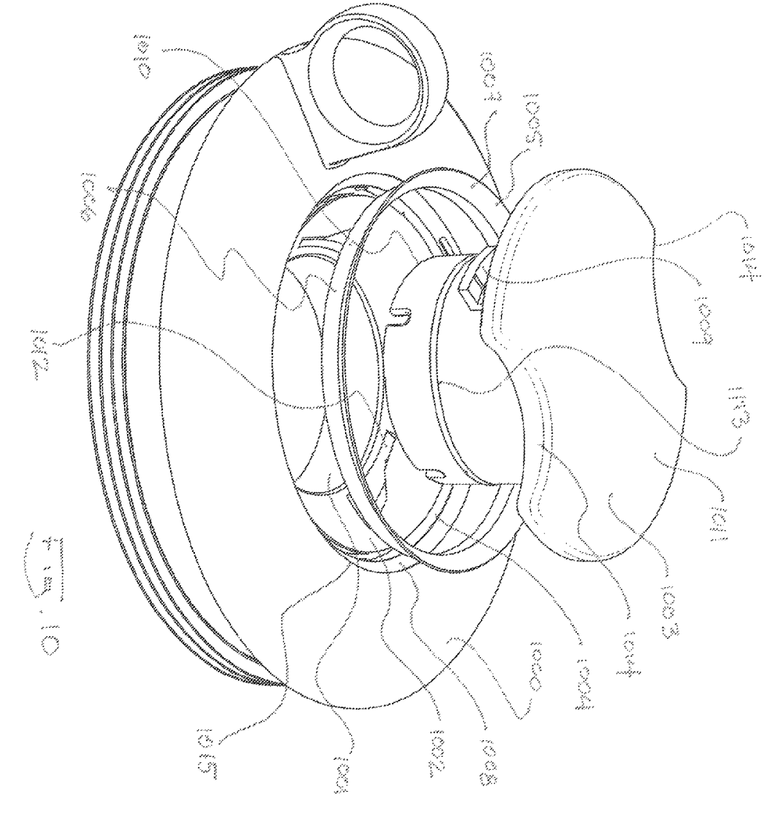
FIG. 10 is another embodiment of a lid having a check valve.

Another way of venting air from the interior of the jug using a check-valve is shown in FIGS. 7, 8 and 9.

As shown in FIG. 7, a lid 700 for a blender jug is constructed, except for the measuring cup, as previously described. It has a cylindrical open ended body 701 and flexible polymeric outer circumferential seal 702 that contacts and seals against an interior of the jug. The upper surface of the lid features a pull-tab 105. However, instead of a removable measuring cup, the lid of FIG. 7 has, in this example, centrally located escape or one-way or check-valve 703 that allows air to escape but not enter the interior of the jug. The valve 703 comprises a clamp cover 704 that, as shown in FIGS. 8 and 9 is received within a central opening 803 of the lid. The clamp cover 704 may have a central plug 801 that fits within the opening 803 and a lower peripheral rim 802 that is received within a recess 806 located on an underside of the upper surface of the lid. In this example, the upper surface 706 of the clamp cover 703 is received and fully contained within a shallow or other well 707 formed on an upper surface of the lid so as to flush mount with respect to the upper surface of the lid. A flexible membrane 901 is clamped or retained between the upper surface 704 of the clamp cover 703 and an upward facing surface 902 of the lid. Venting through holes 805 pass through the upper surface of the lid in the area between the upward facing surface 902 and the central opening 803. The flexible membrane in this example is toroidal and large enough to extend and over and cover the through openings 805. Thus, air can escape from the interior of the jug's through openings 805. When the internal pressure is relieved, the membrane 901 returns to the rest position shown in FIG. 9 and air cannot enter the interior of the jug. In some embodiments, the clamp cover 703 is affixed to the lid moulding by induction welding. This manufacturing method can be facilitated by locating a stainless steel ring 903 between the upper surface 704 of the clamp cover 703 and the lid moulding. In this example, the ring 903 is located radially inward of the through openings 805.

Another example of a one-way or check-valve used in conjunction with a blender lid having a removal measuring cup is shown in FIGS. 10-13. In this example, the lid 1000 has a central opening mot above which is taper or conical pilot 1002 for receiving the measuring cup 1003. An upper margin of the pilot 1002 has a groove 1004 below the pilots rim 1015 for receiving a flexible polymeric seal 1005. The seal 1005 has a cylindrical body portion 1006 that is snugly received in the groove 1004 and a flexible lip 1007 that lies flush against that part 1008 of the pilot 1002 that is vertically above the groove 1004. In this example, the measuring cup's male bayonet features 1009 are located approximately midway between the lower rim of the measuring cup 1010 and the flange 1111. The male bayonet features cooperate with ramped female features 1112, for example, located in the area of the pilot 1002. As previously described, clockwise rotation of the measuring cup draws the measuring cup downward into the lid. The measuring cup also has an external peripheral seal 1113 located vertically below the bayonets features 1009. The peripheral seal 1113 makes contact with an inner surface of the central opening 1001 and prevents air and fluid from escaping above the level of the seal 1113 when the measuring cup is installed. The lid's flange 1003 also features at least one, and in this example two finger grip recesses 1114.

Figures 11, 12:
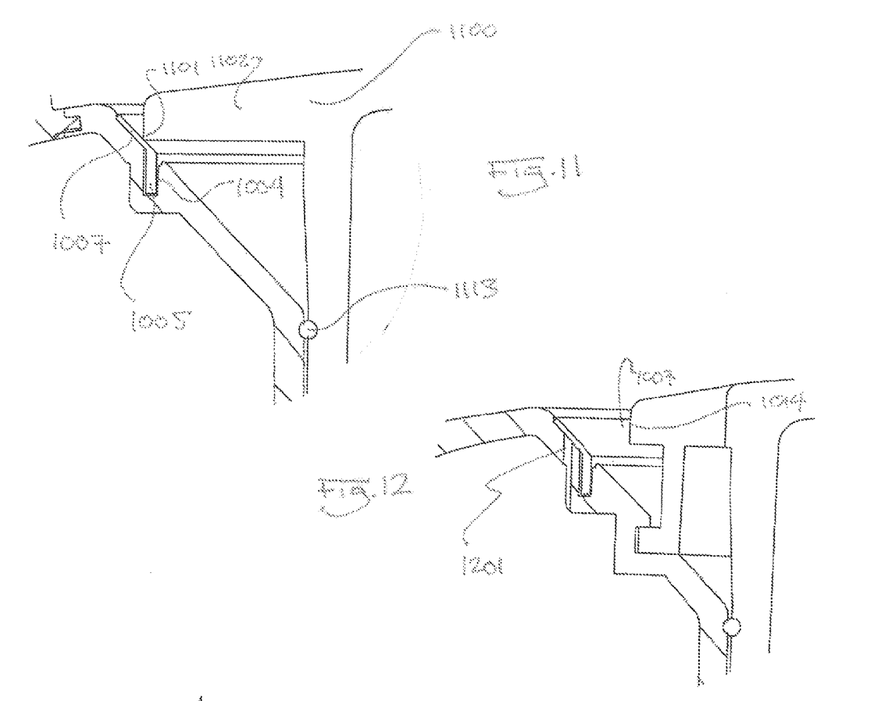
FIG. 11 is a detail, in cross section of a lid depicted in FIG. 10.
FIG. 12 is a detail, in cross section of a lid depicted in FIG. 10.

As shown in FIG. 11, when the measuring cup 1100 is fully installed by rotating the male and female bayonet features into engagement, the lower peripheral rim edge 1101 of the lid's flange 1102 is drawn into engagement with and compresses the flexible lip 1007 of the seal 1005. Thus, because the central passageway is sealed by the measuring cup's peripheral seal 1113 and optionally, by those parts of the flange's lower rim 1101 that make contact with the lip 1007, air from the interior of the jug is only capable of escaping the jug via through openings 1201 located below the lip 1007 in those areas below the flange's grip recesses 1114 where the lower rim edge 1101 of the flange does not make contact with the seal 1005.

Figure 13:
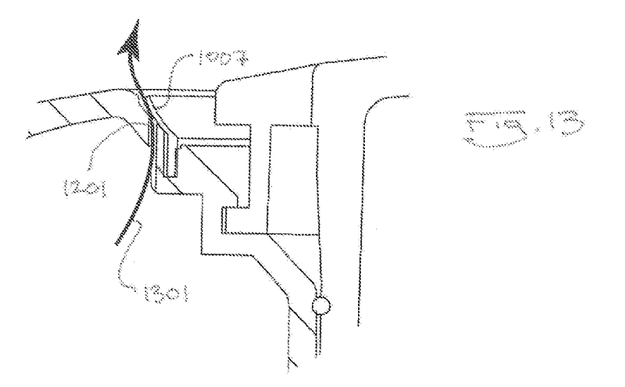
FIG. 13 is a detail, in cross section of a lid depicted in FIG. 10.

As shown in FIG. 13, air escaping through the through openings 1201 is capable of deflecting the lip 1007 and thus exiting the interior of the jug. When the lip 1007 returns to its rest position (FIG. 12) air is not capable of entering the jug through the through openings 1201.

Figure 14:
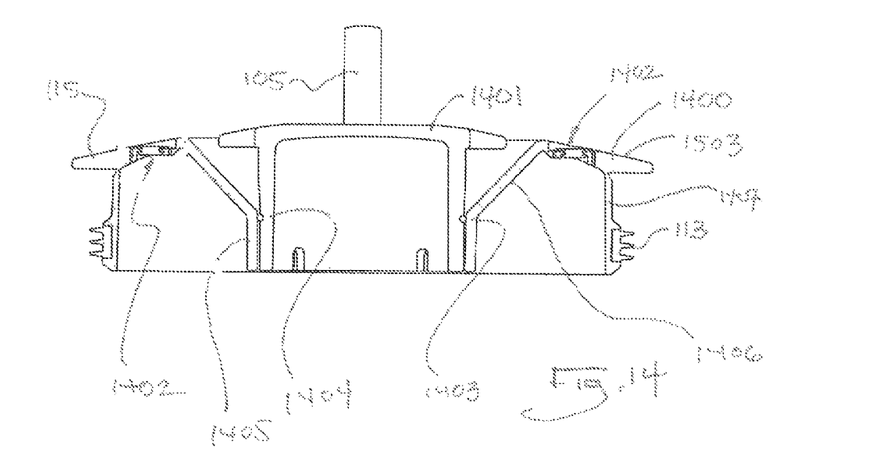
FIG. 14 is a cross section of a lid with measuring cup incorporating check valves.
Figure 15:
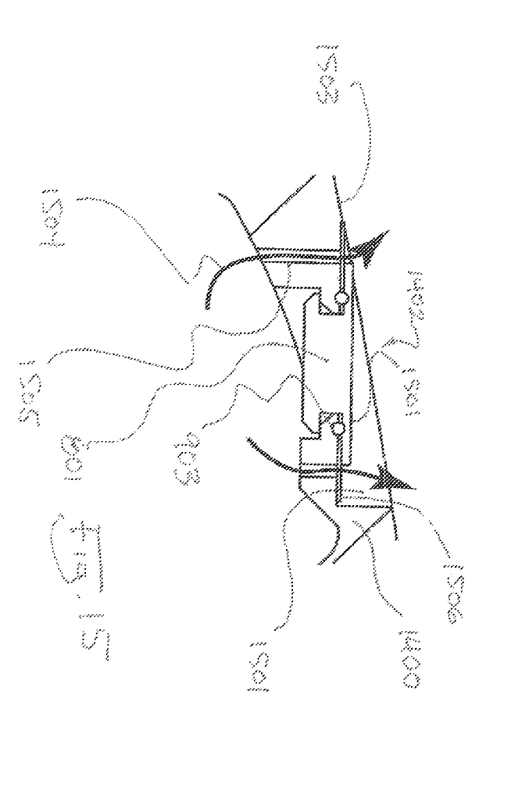
FIG. 15 is a detail of one of the check valves depicted in FIG. 14.

As shown in FIGS. 14 and 15, a juicer lid 1400 may incorporate a measuring cup 1401 and independently from the mechanism of the measuring cup 1401, incorporate one or more one-way or check valves 1402. In this example, the measuring cup is sealed with respect to the lid by a peripheral elastomeric seal such as an O-ring 1403 otherwise. The O-ring in this example fits within a groove on an exterior surface of the cylindrical body of the measuring cup 1404 and makes contact with the internal diameter of the central opening 1405. The check valve 1402 is constructed similarly to the check valve disclosed and described with reference to FIGS. 7, 8 and 9. The clamp cover 1501 of the check valve sits, in this example, within a recess 1502 on an upper surface of the lid 1503. As shown in FIG. 15, air from within the jug 1504 can escape via through openings 1505 located beneath the flexible membrane 1506. It will be appreciated that many check-valve types are known and that a wide variety of check-valves may be used in the lid of a juicer in a way that does not interfere with the operation of the sealed measuring cup 1401. In the example of FIGS. 14 and 15, two check-valves are located diametrically opposite one another and radially outward of the pilot 1406 and radially inward of the sidewall 1407 that carries the primary jug seal 113.

Figure 16:
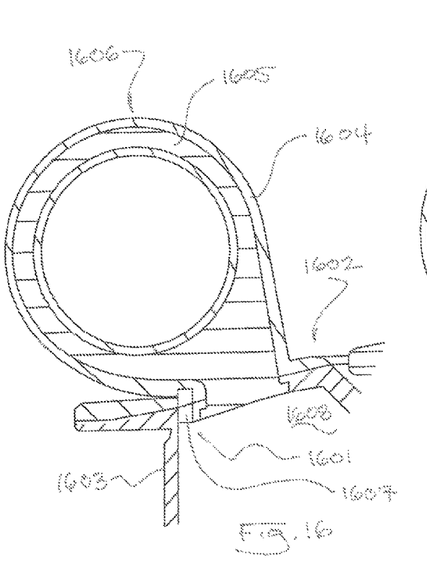
FIG. 16 is a cross sectional view of a lid with pull ring and pressure relief opening in a closed or sealed orientation.
Figure 17:
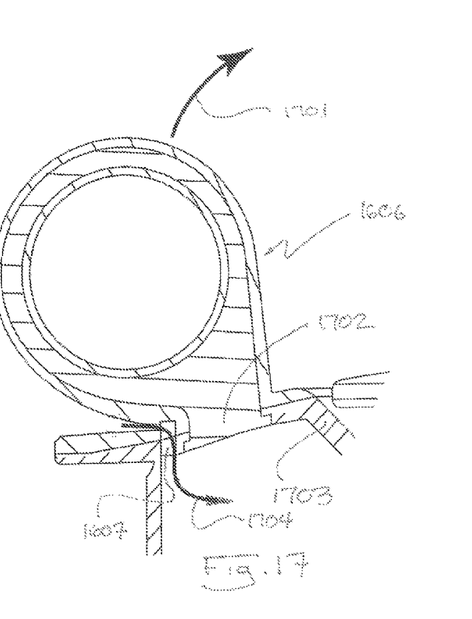
FIG. 17 is a cross section of a lid and pull ring depicted in FIG. 16, in an open orientation.

As shown in FIGS. 16 and 17, the lid may be provided with as vacuum relief port or valve 1601 that may be incorporated into as pull tab, handle or pull ring. In this example, the juicer lid 1601 comprises a moulded polymer body 1603 that is over-moulded with a softer polymer 1604. The core 1605 and over-moulding 1604 of the pull-ring 1606 are moulded so that an underside of the over-moulding 1604 of the pull-ring 1605 covers or occludes a through opening 1607 that leads from an interior of the jug 1608 to the atmosphere. In this neutral or rest position, air attempting to exit the interior 1608 through the through opening 1607 is blocked by the pull-ring 1606 or its over-moulding. However, an as shown in FIG. 17, when a user attempts to remove the lid from the jug by pulling 1701 on the pull-ring 1606 the base 1702 of the pull-ring that is affixed or moulded into the core moulding of the lid 1703 flexes sufficiently to open a channel for air 1704 to enter via the through opening 1607 to the atmosphere. When the pulling force 1701 is released, the pull-ring reverts to the position depicted in FIG. 16 wherein air cannot enter the interior 1608. Because through openings 1607 is small in its cross-sectional area, pressurised air in the interior 1608 will preferentially exit via the check-valve previously disclosed and described, or equivalent structures thereof.

Although the invention has been described with reference to specific examples, it will be appreciated by those skilled in the art that the invention may be embodied in many other forms. In particular the invention is applicable to a lid for a vessel in a domestic food or beverage mixing, blending or processing device in which the otherwise sealed lid is vulnerable to dislodgement by forces within the vessel.

As used herein, unless otherwise specified the use of the ordinal adjectives "first", "second", "third", etc, to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would, be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention.

While the present invention has been disclosed with reference to particular details of construction, these should be understood as having been provided by way of example and not as limitations to the scope or spirit of the invention.

What is claimed is:

1. A lid for a vessel of a food or beverage processing device, the lid comprising:
    a body portion having a peripheral seal that contacts the vessel;
    the lid having a one-way valve for air, the one-way valve oriented to allow air to escape from the vessel;
    the one-way valve being incorporated into a measuring cup that is received by an opening in the lid;
    the one-way valve comprising a lip seal, the opening having a surface that cooperates with the lip seal.

2. The lid of claim 1, wherein:
    bayonet features extend between the lid and the measuring cup.

3. The lid of claim 1, wherein:
    the one-way valve is located within a well so as to flush mount with respect to an upper surface of the lid.

4. The lid of any one of claim 3, wherein:
    the lid has a pull tab to facilitate its removal from the vessel.

5. The lid of claim 1, wherein:
    the lid has a vacuum relieve valve.

6. The lid of claim 5, wherein:
    the relief valve is incorporated into a pull ring.

7. The lid of claim 1, wherein:
    the measuring cup has relief areas that act as finger grips for installing and removing the cup.

8. The lid of claim 1 wherein:
    the opening further comprises a tapered pilot surface.

9. The lid of claim 1, wherein:
    the vessel is a blender jug.

10. In combination, the lid of claim 1, and:
    a vessel having an internal rotating blade, the vessel being sealed by the lid.

11. The lid of claim 1, wherein:
the measuring cup has a circumferential seal.
12. The lid of claim 11, wherein:
the circumferential seal extends outward and downward.
13. The lid of claim 12, wherein:
the lid has a pilot surface against which the circumferential seal flexes when in a fully installed orientation.
14. The lid of claim 13, wherein:
the measuring cup has a fully installed orientation where the seal operates as a check valve.
15. The lid of claim 13, wherein:
the circumferential seal has a lip that exerts a force on the pilot surface that assists in a removal of the measuring cup.
16. The lid of claim 1 wherein:
the measuring cup is received within a cylindrical opening in the lid;
a lower rim of the cylindrical opening having ramped portions that cooperate with a male bayonet feature on the measuring cup.
17. The lid of claim 1, wherein:
the measuring cup is received within a cylindrical opening in the lid;
a lower rim of the cylindrical opening having a ramped portion that cooperates with a male bayonet feature on the measuring cup;
rotation of the measuring cup causing the ramped portion to draw the measuring cup into engagement with a lower portion of the cylindrical opening comprising an internal shelf.
18. The lid of claim 1, wherein:
a gap external to the measuring cup forms a passageway for air to flow towards the lip seal.

* * * * *